United States Patent [19]
Campbell et al.

[11] Patent Number: 5,599,030
[45] Date of Patent: Feb. 4, 1997

[54] WEAR RODS FOR SKIS OF SNOWMOBILES AND SIMILAR VEHICLES

[76] Inventors: Norman A. Campbell, 61 Paget Street, P.O. Box 452, New Liskeard, Ontario P0J 1P0; Donald G. Campbell, Box 4, King Kirkland, Ontario P0K 1K0, both of Canada

[21] Appl. No.: 323,013

[22] Filed: Oct. 14, 1994

[30] Foreign Application Priority Data

Oct. 15, 1993 [CA] Canada ................................. 2108537

[51] Int. Cl.⁶ .................................................... B62B 17/02
[52] U.S. Cl. .................................................... 280/28
[58] Field of Search ................................. 280/28, 16, 17, 280/26, 608; 180/190

[56] References Cited

U.S. PATENT DOCUMENTS

| | | | |
|---|---|---|---|
| D. 170,888 | 11/1953 | Paden et al. | D21/229 X |
| 1,464,204 | 8/1923 | Knowles | 280/28 |
| 2,539,817 | 1/1951 | Ditter | 280/28 X |
| 3,482,849 | 12/1969 | Puetz | 280/28 |
| 3,593,814 | 7/1971 | Bauler | 280/28 X |
| 3,605,926 | 9/1971 | Leonawicz | 180/190 |
| 3,613,809 | 10/1971 | Chaumont | 280/26 X |
| 3,643,979 | 2/1972 | Richards | 280/28 |
| 3,645,347 | 2/1972 | Brant | 280/28 X |
| 3,675,939 | 7/1972 | Vik | 280/28 |
| 3,692,130 | 9/1972 | Stacy, Jr. | 180/190 |
| 3,711,109 | 1/1973 | Hofbauer | 180/190 |
| 3,732,939 | 5/1973 | Samson | 280/28 X |
| 3,739,458 | 6/1973 | Reedy et al. | 280/28 |
| 3,765,695 | 10/1973 | McGregor | 280/28 |
| 3,778,074 | 12/1973 | Kozlow | 280/28 |
| 3,817,544 | 6/1974 | Labelle | 280/28 |
| 3,850,440 | 11/1974 | Reedy et al. | 280/28 |
| 3,870,331 | 3/1975 | Cryderman | 280/28 |
| 3,897,839 | 8/1975 | Brisebois | 280/28 X |
| 3,920,091 | 11/1975 | Kuwano et al. | 180/190 |
| 3,964,561 | 6/1976 | Lunzer et al. | 280/28 X |
| 4,491,333 | 1/1985 | Warnke | 280/28 |
| 4,722,539 | 2/1988 | Molinaro | 280/609 X |
| 5,040,818 | 8/1991 | Metheny | 280/28 |
| 5,145,195 | 9/1992 | Campbell et al. | 280/21 |

FOREIGN PATENT DOCUMENTS 435061  10/1926  Germany ................................. 280/609

*Primary Examiner*—Richard M. Camby

[57] ABSTRACT

A wear rod for skis of snowmobiles and similar vehicles, comprising a horizontal base for engaging an underside of a ski and a vertical wear element projecting downwardly from the horizontal base. The base provides firm support for the wear element and good protection for the ski against bending, whereas the wear element provides good penetration into the snow and good steering control. By making the wear element shorter than the base in the longitudinal direction of the ski, the ratio of the length of the wear element in front of the pivoting point of the ski to the ratio of the length behind this point can be varied to provide favorable steering control characteristics without affecting the support for the ski.

10 Claims, 2 Drawing Sheets

WEAR RODS FOR SKIS OF SNOWMOBILES AND SIMILAR VEHICLES

BACKGROUND OF THE INVENTION

1. Field of the Invention

This invention relates to skis used for snowmobiles and similar vehicles. More particularly, the invention relates to wear rods used on the snow-engaging surfaces of such skis to better control the steering behaviour of the vehicles.

2. Description of the Prior Art

Traditional wear rods consist of a round rod secured to the underside of the ski. Such rods perform two functions, namely they improve steering (particularly turning) and they provide protection for the ski base. The steering bias in such systems is uncontrollable. The length of the wear rod in front of the turning centre of the ski is greater than that which is behind. This allows self-energizing behavior or wander.

The only way a traditional wear rod can increase its turning ability is to extend further to the rear of the ski or to have a larger diameter. The lengthening of the rod far from the turning centre increases turning effort because of the leverage. If a larger rod is used, then steering effort again increases, as does the self-energizing problem.

One attempt to overcome these problems currently being marketed uses a separate flat carrier with an added round conventional rod in a shortened form. This has the obvious problem of inadequate turning ability. It is also difficult in this system to provide different options of round rod length with existing bolt patterns.

All round rods have problems of penetration into hard snow as the rods become worn because the contact width increases. It then requires more weight to penetrate properly. Snowmobiles are very sensitive to this problem and handling suffers considerably.

SUMMARY OF THE INVENTION

An object of the present invention is to improve wear rods used for skis of snowmobiles and similar vehicles.

Another object of the invention is to improve the handling of snowmobiles by improving the design of conventional wear rods.

According to one aspect of the invention, there is provided a wear rod for skis of snowmobiles and similar vehicles, comprising a horizontal base for engaging an underside of a ski and vertical wear element projecting downwardly from the horizontal base.

The invention also relates to a ski incorporating such a wear rod.

In the invention, use is made of a two-part wear rod separating the protective and steering functions of conventional wear rods to enhance the effectiveness of these functions. The horizontal base of the wear rod provides protection for the ski base without creating any steering effects and bias problems. The base also provides improved strength to resist lateral bending with much better mechanical advantage, and this benefit is unaffected by wear of the rod. Furthermore, the base can support an attachment for attaching the base to the ski, normally a number of bolts upstanding from the base. Any bolt pattern for mounting to the ski can be accommodated by the base. The horizontal base also allows the mounting bolts and wear elements to be offset for ease of access to mount bolts and better structural support from the ski for the wear element.

The wear element is preferably an elongated vertical rectangular component that allows the contact width of the rod to remain the same as wear progresses. This provides consistent penetration into the snow without having to adjust ski bearing pressure. The height and length selections for the wear element can be varied according to rider preferences and demand. The position of the wear element front and rear can be predetermined to achieve a desired bias relationship.

Thus, in the present invention, the base generally extends horizontally in the lateral direction of the ski by a considerably greater distance than the narrower wear element. The wide base, thus provides support for the wear element and protection for the ski and the narrower wear element provides good penetration into the snow and enhanced steering control.

Traditional skis have steering engagement surfaces, referred to as keels, incorporated into their bases. These longitudinal keels are unadjustable and create bias problems for designers. Because the mount bolt or load application point for the ski must be to the rear to the ski centre, this keel creates self-energizing steering behaviour. A wear rod according to the present invention needs no such keel. Greater steering control by the wear rod and not the keel allows for a much wider range of adaptability with simple wear rod change.

Wear resistant carbide inserts may be used with the wear rods of the present invention at the lower snow-engaging ends to minimize wear rates on hard surfaces. The provision of such inserts is straight forward in wear rods according to the present invention.

DESCRIPTION OF THE PREFERRED EMBODIMENTS

Figure 1:
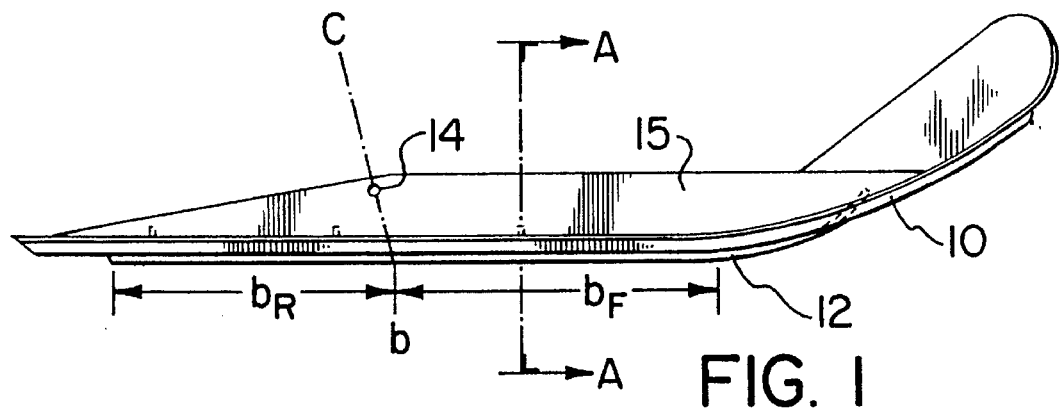
FIG. 1 is an elevation showing a conventional ski having a wear rod configuration.

FIG. 1 shows a traditional ski 10 and wear rod 12. Dotted line C represents the turning centre of the ski with a common caster angle, point b is the point of contact from which bias is measured, $b_f$ is the effective length of the front of the wear rod and $b_r$ is the rear length of the wear rod. Note that $b_f$ can change depending on snow conditions and ski flotation depth but it invariably changes for the worse, i.e. with the effect of decreasing ease of handling. In order for a ski to behave properly, $b_f$ should be shorter than $b_r$ which it is not in the conventional deign. This creates wander and dangerous self-energizing behavior of the ski.

Figure 2:
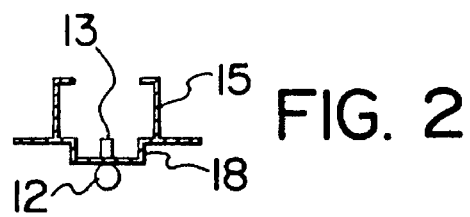
FIG. 2 is a cross-section at A—A of FIG. 1.

Furthermore, in the conventional ski of FIG. 1, the ski mount bolt 14 must be positioned to the rear of the centre of the ski to have the ski perform properly by floating up on the snow. This requirement is a major problem with skis having cross-sections of the type shown in FIG. 2.

The wear rods 12 are provided with retaining bolts 13 that pass through holes drilled in the skis and are retained by bolts (not shown). However, in the conventional ski, the bolts are inconveniently located within the superstructure 15 of the ski, making replacement difficult.

Figure 3:
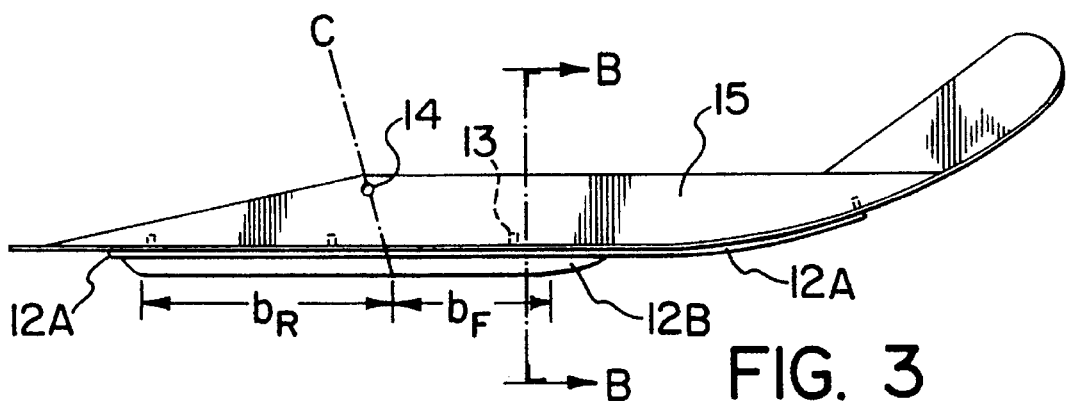
FIG. 3 is an elevation of a ski of having a wear rod according to a preferred form of the present invention.
Figure 4A:
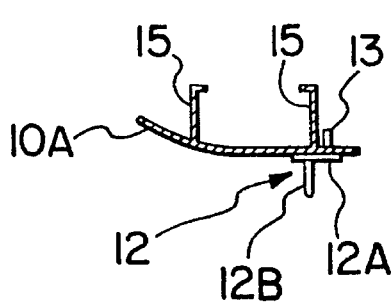
FIG. 4A is a cross-section of the ski of FIG. 3 at B—B showing a left ski.
Figure 4B:
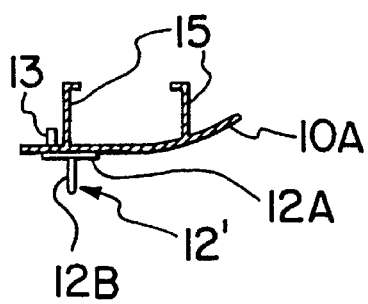
FIG. 4B is a view similar to FIG. 4A showing a right ski.

FIG. 3 show a ski designs according to the present invention incorporating novel wear rod designs and FIGS. 4A and 4B show cross-sections on the line B—B of left and right versions of this ski. Each wear rod comprises a flat horizontal base 12A that extends to the front of the ski without imparting any turning ability or bias problems. The base contacts the lower surfaces 10A of the skis and serves as a supportive element for the wear rod and as a protective element for the ski to distribute forces impacting on wear elements 12B that form lower ground-engaging parts of the wear rods 12. The wear elements in this form of the invention are elongated rectangular plates having pointed lower edges and they extend longitudinally along the bases of the skis, but separated from the skis by the bases 12A. However, as shown in FIG. 3, the bases of the wear rods may extend for a greater distance along the ski, particularly at the front, providing a favourable relationship of $b_f$ to $b_r$ for good ski bias without affecting the steering characteristics of the skis.

FIGS. 4A and 4B show a pair of skis in their normal orientation as seen from the rear. Wear rod mount bolts 13 are offset from the central vertical plane of the base 12A making the retaining bolts (not shown) more readily accessible along the inner edges of the skis. Moreover, the vertical wear elements 12B are also offset from the central vertical plane on the opposite side of that plane than the bolts 13 so that the wear elements 12B is well supported by one side of the superstructure 15 on the upper side of the ski. This is helps considerably to prevent collapse of the ski base upwardly when hard impact forces are encountered.

Figure 5:
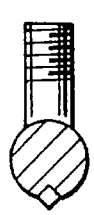
FIG. 5 is a cross-section of a traditional wear rod provided with a carbide wear insert in accordance with the present invention.

FIG. 5 shows a conventional wear rod for comparison with the succeeding Figures described below.

Figure 6A:
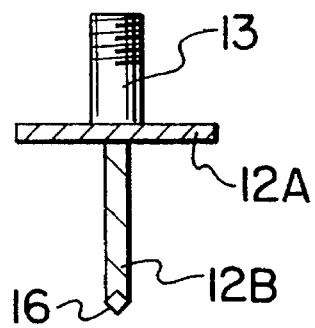
FIG. 6A is a cross-section of a wear rod according to one form of the invention.
Figure 6B:
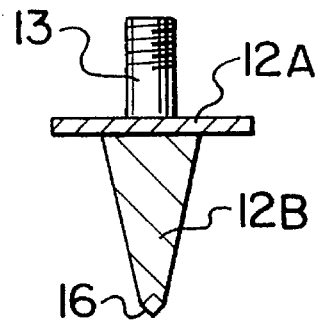
FIG. 6B is a cross-section of a wear rod similar in design to that of FIG. 6A.

FIG. 6A shows one form of a wear rod of the present invention in cross-section with a top mount bolt 13, a horizontal base 12A and a vertical wear element 12B. The extreme lower end of the wear element 12B is provided with a carbide wear-resistant insert 16 embedded in the metal of the wear element. FIG. 6B is a cross-section of a similar wear rod, except that the wear element is tapered inwardly from a broad upper end to a narrow lower end. This design imparts greater strength to the wear element, although it means that the surface area of the lower end increases as wear progresses. In these embodiments, the top mount bolts 13 and the wear elements 12B are both mounted in line with the central vertical longitudinal plane of the bases 12A.

Figure 7A:
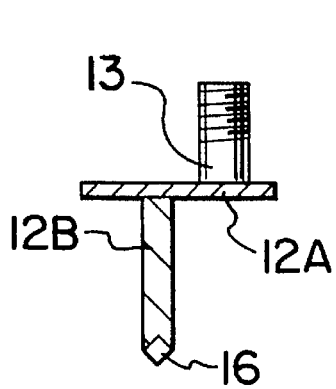
FIGS. 7A and 7B are cross-sections of a wear rod according to a further form of the invention showing forms suitable for left and right skis, respectively.
Figure 7B:
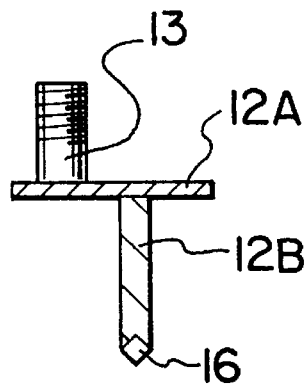

FIGS. 7A and 7B are cross-sections in greater detail of the wear rods 12 shown in FIGS. 4A and 4B. These rods are also provided with carbide inserts 16 at the lower ends. As noted above, the top mount bolts 13 and the wear elements 12B are offset from the center of the base 12A to allow better bolt access and better support of the wear element by the ski.

In preferred embodiments of the invention, the base has dimensions of about ⅛×1×28 inches and the wear element has dimensions of about ¼×¾×22 inches with a 2 inch rear bias.

Figure 8:
FIG. 8 is traditional ski and wear rod cross-section showing collapse of a keel section above the wear rod.

FIG. 8 shows a cross-section of a conventional ski and wear rod showing collapse of the ski keel 18 over the wear rod 12 due to impact with a hard object such as rocks. This drastically reduces the function of the wear rod and the ski. In contrast, the wear rods of the present invention can be used on skis having no downwardly projecting keels 18 since the bases 12A provide good support for the ski against unwanted flexing and bending.

Although the invention has been described in detail above with reference to preferred embodiments, it will be appreciated by persons skilled in the art that various modifications and alterations would be possible without departing from the spirit and scope of the invention.

What we claim is:

1. A wear rod for skis of snowmobiles and similar vehicles, comprising a generally flat horizontal base for engaging an underside of a ski and a generally vertical wear element projecting downwardly from the horizontal base, wherein said base has dimensions of about ⅛×1×28 inches and said wear element has dimensions of about ¼×¾×22 inches.

2. A wear rod for skis of snowmobiles and similar vehicles, comprising a generally flat horizontal base for engaging an underside of a ski, a generally vertical wear element projecting downwardly from the horizontal base, and at least one bolt upstanding from said base forming an attachment for mounting said wear rod said ski, wherein said base and said bolt are offset laterally from a vertical longitudinal plane of said base on opposite sides of said plane.

3. A steering ski for a snowmobile or similar vehicle having a ski element and a wear rod attached to a lower surface of said ski element, said wear rod comprising a generally flat horizontal base for engaging said lower surface of said ski element and a generally vertical wear element projecting downwardly from the horizontal base, wherein said base extends in a lateral direction of said ski by a greater extent than said wear element.

4. A wear rod for skis of snowmobiles and similar vehicles, comprising a generally flat horizontal base for engaging an underside of a ski and a generally vertical wear element projecting downwardly from the horizontal base, wherein said base extends in a lateral direction of said ski by a greater extent than said wear element.

5. A wear rod according to claim 4 wherein said base has an area large enough to protect said ski in use from collapse around said wear element upon impact of said wear element with stationary objects.

6. A wear rod according to claim 4 wherein said wear element has a generally rectangular cross-section having a height and width suitable in use to impart stable steering characteristics to said ski.

7. A wear rod according to claim 4 wherein said base extends in a longitudinal direction of said ski by a greater length than said wear element.

8. A wear rod according to claim 4 further comprising an attachment for mounting said wear rod to said ski.

9. A wear rod according to claim 8 wherein said attachment comprises at least one bolt upstanding from said base.

10. A wear rod according to claim 4 having a wear resistant insert at a lower end of the wear element.

* * * * *